UNITED STATES PATENT OFFICE.

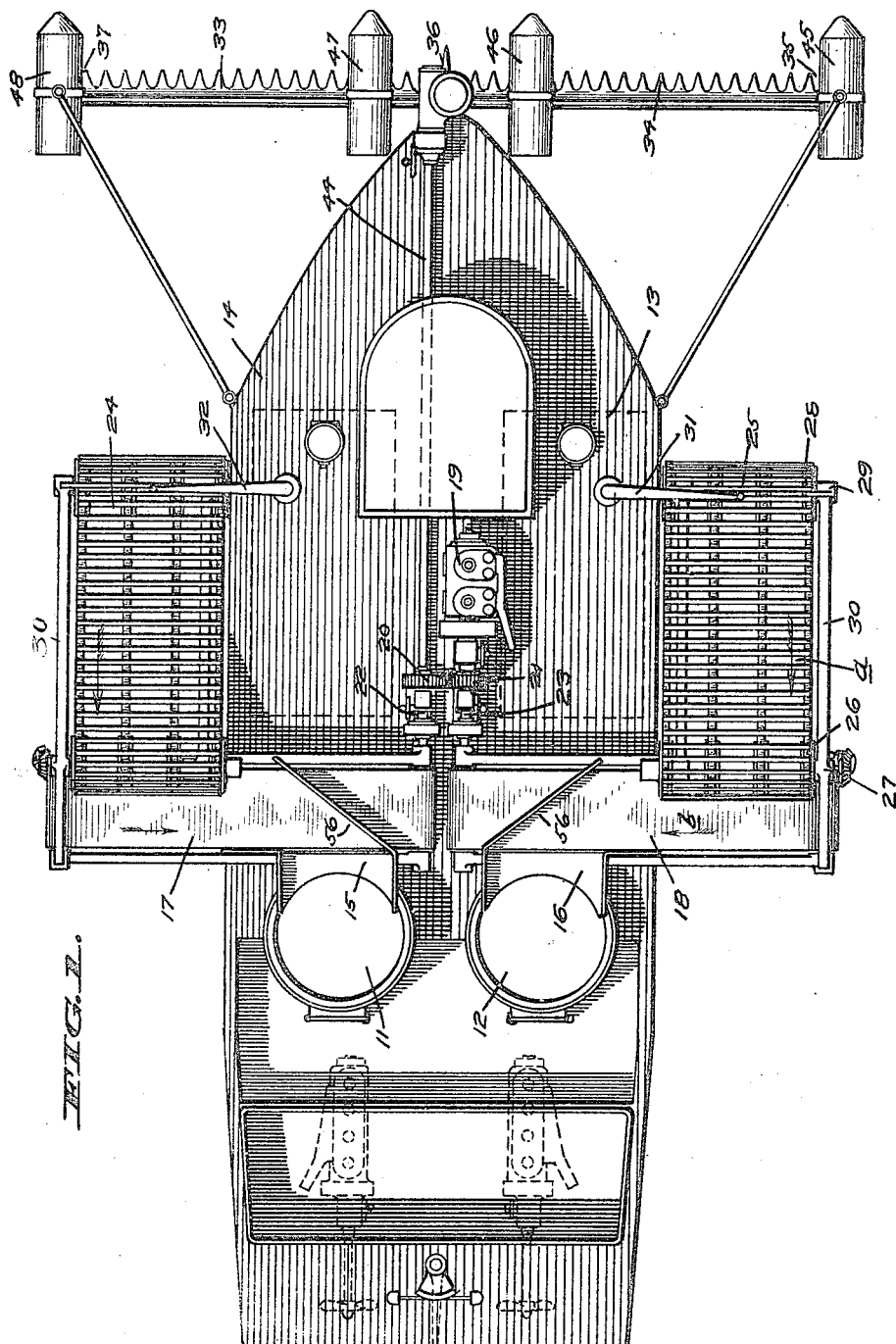

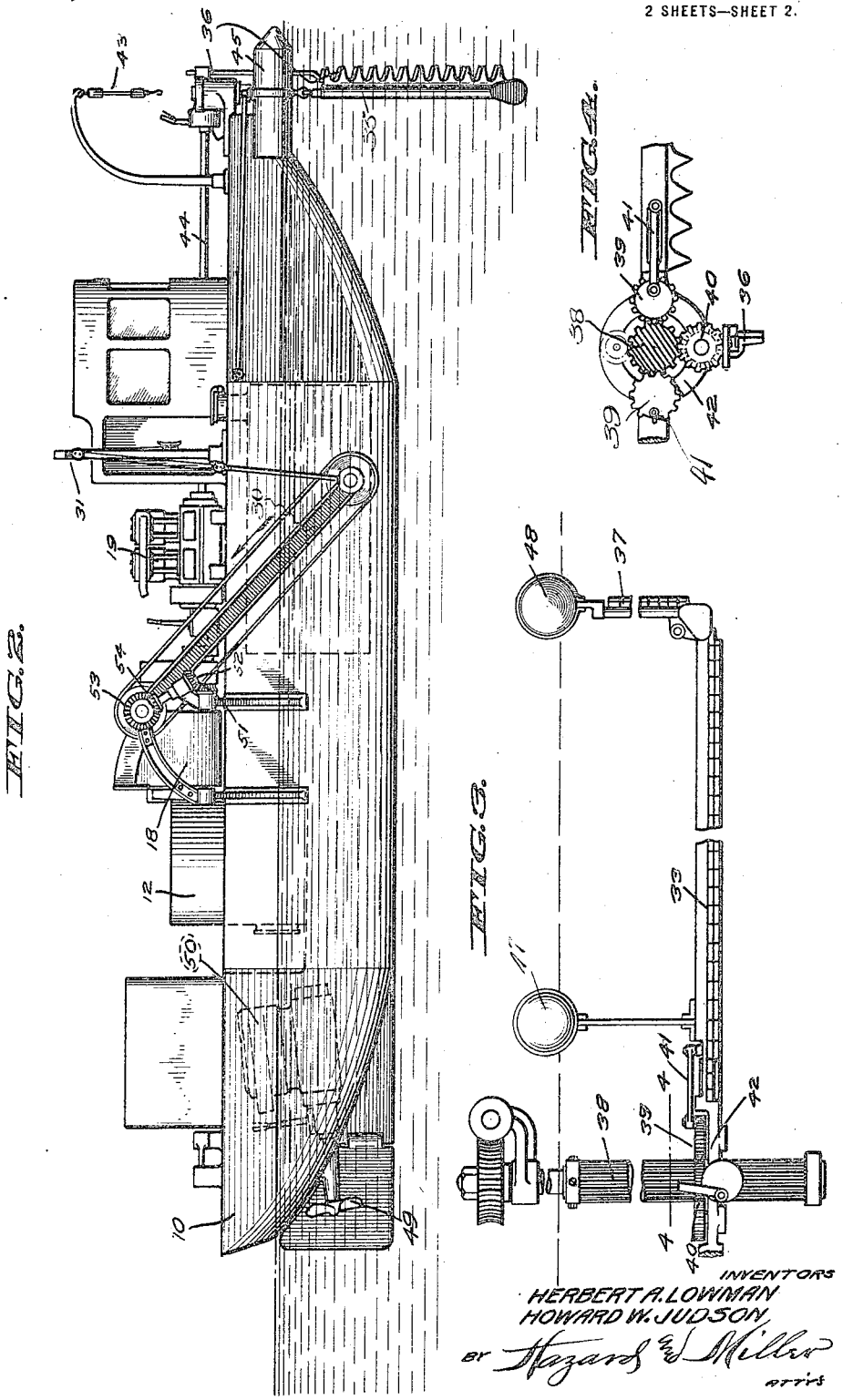

HOWARD W. JUDSON, OF LONG BEACH, AND HERBERT A. LOWMAN, OF WILMINGTON, CALIFORNIA, ASSIGNORS OF ONE-HALF TO SEA PRODUCTS COMPANY, OF LONG BEACH, CALIFORNIA, A CORPORATION OF CALIFORNIA.

HARVESTING AND REDUCTION APPARATUS FOR SEA-KELP.

1,259,456.      Specification of Letters Patent.      Patented Mar. 12, 1918.

Application filed December 19, 1916. Serial No. 137,889.

*To all whom it may concern:*

Be it known that we, HOWARD W. JUDSON and HERBERT A. LOWMAN, citizens of the United States, residing at Long Beach and Wilmington, respectively, in the county of Los Angeles and State of California, have invented new and useful Improvements in Harvesting and Reduction Apparatus for Sea-Kelp, of which the following is a specification.

This invention relates to a harvesting and reduction apparatus for sea weed.

Due to the decrease in shipment of potassium oxid ($K_2O$) since the beginning of the European war, it has been necessary for this chemical to be made by reduction from other material, and kelp has been used to considerable advantage. This process has been a slow and expensive one and it is the principal object of this invention to provide means for rapidly harvesting the kelp or sea weed and reducing it at the harvesting point so that a fair grade of potassium oxid may be produced in large quantities and with small expense.

It is an object of this invention to provide a boat upon which is mounted means for harvesting sea kelp and thereafter reducing it to kelp ash within suitable reduction furnaces mounted upon the boat.

Another object of this invention is to provide cutting members which are adapted to act upon the kelp to cut it longitudinally and vertically.

Another object of this invention is to provide means for maintaining the cutting members at a given angle irrespective of the buoyant movement of the boat.

Another object of this invention is to provide conveying means which will act with certainty to elevate the kelp, previously cut, on to the boat and convey it to suitable reduction furnaces.

Another object of this invention is to provide adjustable means for regulating the depth at which the kelp is cut and also adjusting the conveying mechanism to correspond with the cutting depth.

It is a further object to provide a harvesting and reduction apparatus as herein described which shall be effective and efficient in its action and which will permit large quantities of kelp to be cut and immediately reduced to ash for the production of potassium oxid.

Other objects will appear hereinafter.

The invention is illustrated, by way of example, in the accompanying drawings in which:

Figure 1 is a view in plan elevation illustrating a boat or barge fitted with cutting knives, conveyers, and reduction furnaces for the harvesting and treatment of sea kelp.

Fig. 2 is a view in side elevation illustrating the boat shown in Fig. 1 and particularly disclosing the mounting provided the cutting knives and the adjustable mounting provided the conveyer.

Fig. 3 is a fragmentary view of the driving mechanism provided the cutting elements and also of one of the horizontal and one of the vertical cutting elements as mounted in operative position in relation to said driving mechanism.

Fig. 4 is an enlarged fragmentary view in section and elevation as seen on the line 4—4 of Fig. 3 and as illustrating the arrangement of the driving gears.

Referring more particularly to the drawings, 10 indicates a boat of any desired construction, upon which are mounted reduction furnaces 11 and 12. These furnaces are supplied with fuel oil from suitable storage reservoirs 13 and 14. The upper ends of the furnaces are adapted to be opened and to communicate with passages 15 and 16 which in turn are in communication with transversely disposed conveyer belts 17 and 18. These belts extend cross-wise above the deck of the boat and are driven by an engine 19 through gears 20 and 21 which in turn drive shafts 22 and 23. These belts are mounted upon suitable frame-work which extends outwardly upon the opposite sides of the deck in an overhanging manner, and are disposed beneath the upper ends of elevating platforms 24 and 25. These platforms are formed of slats and pass around a series of driving disks 26 positioned above the deck upon a shaft 27, and a series of driving disks 28 mounted upon a shaft 29. The shafts 29 are rotatably mounted within swinging arms 30 which allow the elevating platform to be vertically adjusted at the side of the boat. The forward and lower end of each platform is adjustably supported from crane arms 31 and 32 which overhang the boat and carry suitable block and tackle for the support of said platforms.

The conveying mechanism, previously described, is provided for the purpose of elevating and conveying sea weed from the water after it has been cut by means of horizontal cutters 33 and 34, or vertical cutters 35, 36 and 37. These cutters are constructed in the same manner as the sickles used upon mowing machines and are adapted to be actuated from a common vertical drive-shaft 38 which is formed with longitudinally extending teeth which mesh with a pair of driven gears 39 and a bevel gear 40. The driven gears 39 act through pitman rods 41 to reciprocate the horizontal sickles 33 and 34 and to impart motion to the vertical sickles 35 and 37. The bevel gear 40 is provided to drive the centrally disposed vertical cutter 36. These gears are mounted upon a gear frame 42 which is adapted to be raised and lowered, as may be desired, by a block and tackle 43. The shaft 38 is driven through a drive-shaft 44 by the engine 19.

When the boat is in operation in a rough sea, the prow, upon which the sickles are mounted will rise and fall. It is therefore necessary to provide means for maintaining the sickles within the water at an approximately uniform depth. This is done by means of a series of floats 45—48 inclusive which directly support the sickles and cause them to rise and fall with the sea.

In operation, the boat is propelled by means of suitable propellers 49 and engines 50. When a kelp field has been reached the engine 19 may be started and will reciprocate the various horizontal and vertical sickles, as well as rotate the shafts 22 and 23 for driving the conveyer belts 17 and 18. As these belts are driven, their outer shafts will rotate bevel gears 51 and 52 which are suitably connected with gears 53 and 54 upon the shafts 27 of the elevating platforms, thus advancing the platforms in the direction of the arrow —a— while the conveyer belts travel in the direction of the arrow —b—. As the kelp is cut, the boat advances and causes the cut material to be engaged by the slat elevating platform and raised above the deck of the boat, after which it is deposited upon the transverse conveyer belts and carried toward the center of the vessel and the reduction furnaces. Raker arms 55 and 56 are positioned over the conveyer belts and disposed at an angle so as to divert the kelp from the belts and into the passage-ways 15 and 16 leading to the furnaces. These furnaces are provided with oil burners which supply a proper degree of heat to reduce the kelp to ash, which may be removed through suitable doors and thereafter packed for shipment. By the term boat we include all kinds of seagoing vessels, such as barges, boats, self-propelled or otherwise.

It will thus be seen that the apparatus here disclosed affords an efficient means for harvesting and reducing kelp to ash without the requirement of an elaborate mechanism or additional conveying means and thus provides for the rapid production of large quantities of potash.

While we have shown the preferred construction of our kelp harvesting and reduction apparatus as now known to us, it will be understood that various changes in the combination, construction and arrangement of parts may be made by those skilled in the art without departing from the spirit of our invention.

We claim:

1. In a kelp harvesting and reduction apparatus, the combination with a boat, of a power plant mounted thereupon, a vertical drive shaft secured at the prow of the boat and extending downwardly into the water, said shaft being driven by the power plant, teeth formed circumferentially of said shaft and extending the length thereof, spur gears disposed around said shaft and in mesh with said teeth, a supporting ring upon which said gears are mounted, sickles mounted upon said ring and adapted to be actuated by said gears as the shaft rotates, and float members disposed along the length of said sickles in a manner to support them beneath the surface of the water within which they are operated.

2. In a kelp harvesting and reduction apparatus, the combination with a boat, of a power plant mounted thereupon, a vertical drive shaft secured at the prow of the boat and extending downwardly into the water, said shaft being driven by the power plant, teeth formed circumferentially of said shaft and extending the length thereof, spur gears disposed around said shaft and in mesh with said teeth, a supporting ring upon which said gears are mounted, sickles mounted upon said ring and adapted to be actuated by said gears as the shaft rotates, float members disposed along the length of said sickles in a manner to support them beneath the surface of the water within which they are operated, inclined conveyer belts disposed at opposite sides of the boat to gather and elevate the material cut by the sickles, transverse conveyer belts upon which the material from the elevating belts is dumped, and an incinerator provided to receive the material from the transverse belts.

3. In a kelp harvesting and reduction apparatus, the combination with a boat, of a series of vertical cutting sickles positioned at the forward end of said boat and in parallel relation to each other, transverse sickles interposed between said vertical sickles, floats by which said vertical and transverse sickles are supported beneath the surface of the water, means whereby the sickles may be actuated irrespective of the position of the boat in relation thereto, elevating conveyers at the opposite sides of the boat for gathering the material cut by the sickles, transverse conveyers into which the material is dumped from the elevating conveyers, and an incinerator to which the material is carried by the transverse conveyers.

In testimony whereof we have signed our names to this specification.

HOWARD W. JUDSON.
HERBERT A. LOWMAN.

Copies of this patent may be obtained for five cents each, by addressing the "Commissioner of Patents, Washington, D. C."